US012681845B2

(12) United States Patent
Roberts

(10) Patent No.: US 12,681,845 B2
(45) Date of Patent: Jul. 14, 2026

(54) NEAR-MEMORY PROTOCOL ANALYZER

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 163 days.

(21) Appl. No.: 18/615,046

(22) Filed: Mar. 25, 2024

(65) Prior Publication Data

US 2024/0403205 A1 Dec. 5, 2024

Related U.S. Application Data

(60) Provisional application No. 63/469,724, filed on May 30, 2023.

(51) Int. Cl.
*G06F 12/02* (2006.01)
*G06F 3/06* (2006.01)
*G06F 11/30* (2006.01)

(52) U.S. Cl.
CPC .......... *G06F 12/0223* (2013.01); *G06F 3/061* (2013.01); *G06F 3/0658* (2013.01); *G06F 3/0688* (2013.01); *G06F 11/3037* (2013.01)

(58) Field of Classification Search
None
See application file for complete search history.

(56) References Cited

U.S. PATENT DOCUMENTS

| | | | | |
|---|---|---|---|---|
| 7,302,614 B2 * | 11/2007 | Goto | ................... | H04L 43/0817 |
| | | | | 714/43 |
| 7,548,842 B2 * | 6/2009 | Ganesan | ................. | G06F 30/33 |
| | | | | 370/258 |
| 8,234,524 B1 * | 7/2012 | Smith | ..................... | H04L 43/16 |
| | | | | 709/200 |
| 8,499,201 B1 * | 7/2013 | Chiu | ................... | G06F 11/3471 |
| | | | | 714/42 |
| 11,061,572 B2 | 7/2021 | Roberts et al. | | |
| 2002/0078264 A1 * | 6/2002 | Eberhard | .............. | G06F 11/349 |
| | | | | 710/1 |
| 2006/0277435 A1 * | 12/2006 | Pedersen | ............. | G06F 11/3636 |
| | | | | 714/30 |
| 2014/0026126 A1 * | 1/2014 | Richter | ............... | G06F 11/3656 |
| | | | | 717/128 |
| 2017/0139765 A1 * | 5/2017 | Ko | ....................... | G06F 11/0727 |
| 2017/0308297 A1 | 10/2017 | Roberts et al. | | |
| 2021/0271408 A1 * | 9/2021 | Spica | ..................... | G06F 3/0611 |
| 2022/0036960 A1 * | 2/2022 | Ingram | ................ | G11C 29/028 |
| 2022/0334963 A1 * | 10/2022 | Patel | ................... | G06F 12/0877 |

* cited by examiner

*Primary Examiner* — Kaushikkumar M Patel

(74) *Attorney, Agent, or Firm* — Schwegman Lundberg & Woessner, P.A.

(57) ABSTRACT

Devices and methods are disclosed, including receiving, by a memory controller of a memory device, a memory request from a host device; collecting packet trace data from the memory request; including the packet trace data in a log stored in a memory array of the memory device; and returning the log to the host device.

18 Claims, 5 Drawing Sheets

300

305
RECEIVING, BY A MEMORY CONTROLLER OF THE MEMORY DEVICE, A MEMORY REQUEST FROM A HOST DEVICE

310
COLLECTING PACKET TRACE DATA FROM THE MEMORY REQUEST

315
INCLUDING THE PACKET TRACE DATA IN A LOG STORED IN A MEMORY ARRAY OF THE MEMORY DEVICE

320
RETURNING THE LOG TO THE HOST DEVICE

NEAR-MEMORY PROTOCOL ANALYZER

PRIORITY APPLICATION

This application claims the benefit of priority to U.S. Application Ser. No. 63/469,724, filed May 30, 2023, which is incorporated herein by reference in its entirety.

STATEMENT REGARDING GOVERNMENT SUPPORT

This invention was made with U.S. Government support under Contract No. 548143, awarded by PNNL. The U.S. Government has certain rights in the invention.

TECHNICAL FIELD

Embodiments of the disclosure relate generally to managed memory devices, and more specifically relate to a memory device having an embedded protocol analyzer.

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host devices typically include a host processor, a first amount of main memory (e.g., often volatile memory, such as DRAM) to support the host processor, and one or more memory devices (e.g., often non-volatile memory, such as flash memory) that provide additional storage to retain data in addition to or separate from the main memory.

A memory device can include a memory controller and one or more memory integrated circuit (IC) dies. The dies can be configured into one or more memory arrays. The memory controller can include interface circuitry configured to communicate with a host device (e.g., the host processor or interface circuitry) through a communication interface (e.g., a bidirectional parallel or serial interconnect bus). The memory controller can receive commands or operations from the host system in association with memory operations or instructions, such as read or write operations to transfer data (e.g., user data and associated integrity data, such as error data or address data, etc.) between the memory devices and the host devices, erase operations to erase data from the memory devices, perform drive management operations (e.g., data migration, garbage collection, block retirement), etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Software (e.g., programs), instructions, operating systems (OS), and other data are typically stored on storage systems and accessed by main memory for use by a host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host devices can include different levels of volatile memory, such as a group of static memory (e.g., a cache, often SRAM), often faster than the main memory, in certain examples, configured to operate at speeds close to or exceeding the speed of the host processor, but with lower density and higher cost. In other examples, different levels or quantities of main memory or static memory can be used, depending on desired host device performance and cost.

Programmers may want to monitor and log the traffic on the interconnect bus between the host devices and main memory. This monitoring provides information to the programmers regarding behavior of their programs and the memory performance when executing the programs.

Figure 1:
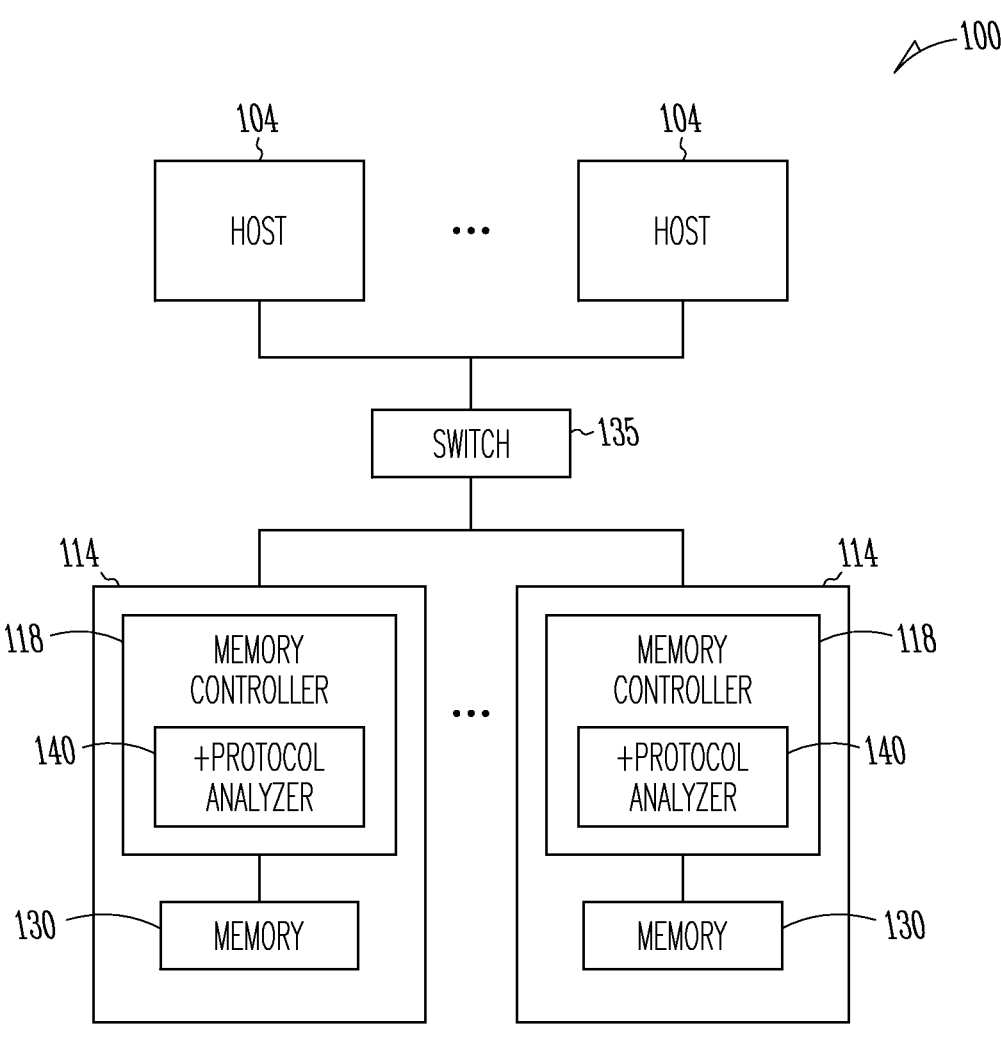
FIG. 1 is a block diagram of a computer system according to some examples described herein.

FIG. 1 is a block diagram of an example computer system 100 including two host devices 104 (e.g., host server processors) connected to two memory devices 114. The example shows two host devices and two memory devices for simplicity of the diagram, but an actual implementation may include many host devices 104 and memory devices 114. The host devices 104 are connected to the memory devices 114 via a memory switch 135 (e.g., Gen-Z, Peripheral Component Interconnect Express (PCIe), Compute Express Link (CXL), etc.). The memory devices 114 can include one or more memory integrated circuit (IC) chips or memory dies 130, and a memory controller 118. Data stored in the memory devices 114 can be accessed using a switch protocol to bring the data over the memory switch. In some examples, a memory device 114 is directly connected to a host device 104. In certain examples, the processing device is an in-memory processor.

Figure 2:
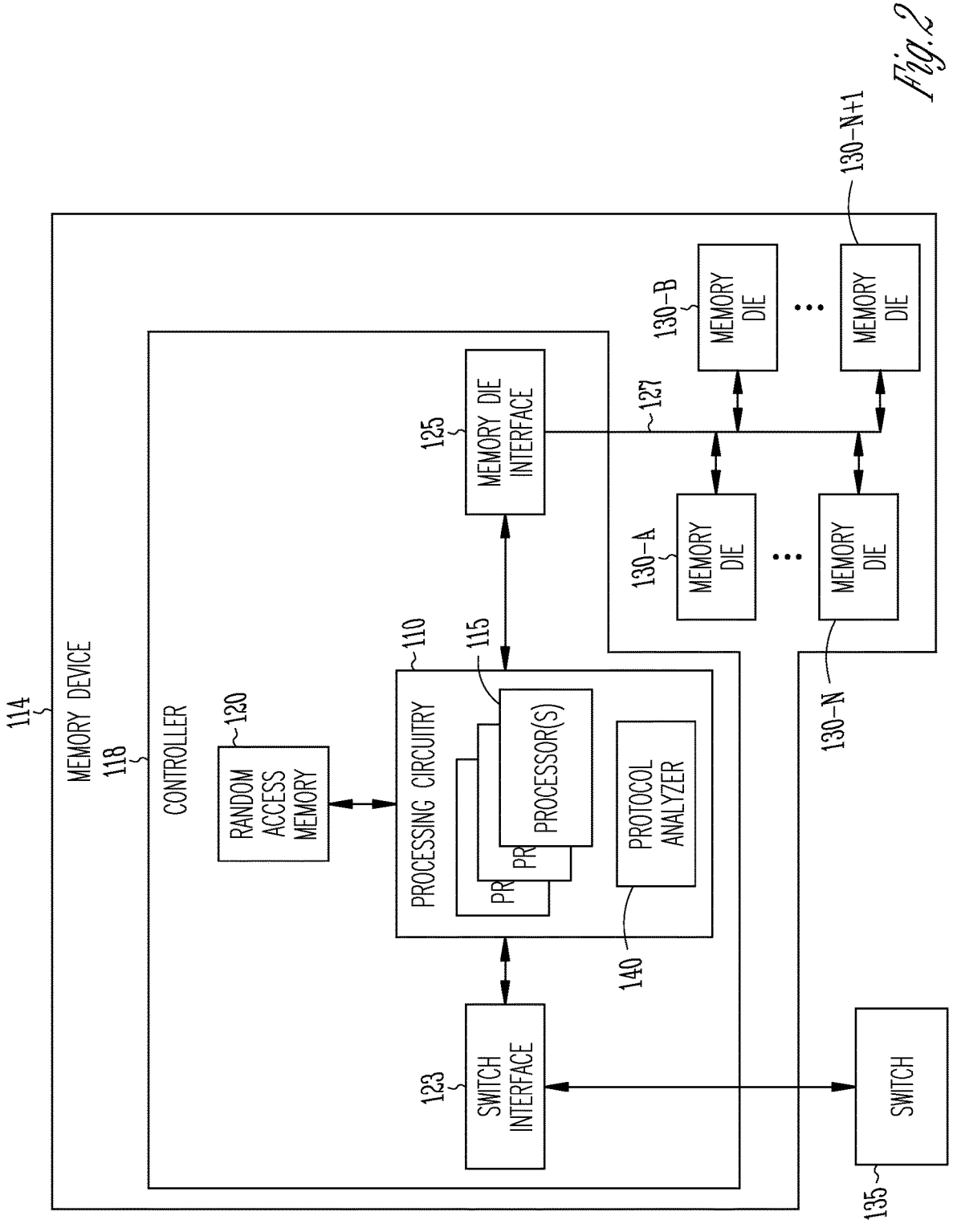
FIG. 2 is a block diagram of a memory device according to some examples described herein.

FIG. 2 is a block diagram of an example memory device 114 suitable for use as memory device 114 in FIG. 1. The memory device 114 includes a memory controller 118 and a memory array including, for example, memory cells included in one or more memory die (130-A, 130-B . . . 130-N). The memory device 114 includes a switch interface 123 to memory switch 135. The host devices communicate with the memory devices via the memory switch 135 and switch interface 123.

The memory controller 118 may receive instructions from a host device 104, and may communicate with the memory array, such as to transfer data to (e.g., write) or from (e.g., read), or to erase one or more of the memory cells, planes, sub-blocks, blocks, or pages of the memory array. For example, the memory controller 118 includes processing circuitry 110, which may include one or more processors 115 which, when present, operate to execute instructions stored in the memory device 114 (e.g., stored in memory 120). For purposes of the present examples, the instructions will be discussed as firmware, though instructions may also be present as software; and all or some portion of the described functions may also be implemented in circuitry including one or more components or integrated circuits. The processing circuitry 110 is configured to control access across the memory array and to provide a translation layer between the host device 104 and the memory array. Additionally, the memory controller 118 may include a memory die interface 125 to interface with the memory die on memory bus 127. In some examples, the memory die interface 125 may be an Open NAND Flash Interface (ONFI).

Returning to FIG. 1, the memory devices 114 includes a protocol analyzer 140 embedded in the memory controllers 118. The logic for the protocol analyzer 140 may be implemented in the processing circuitry 110 of the memory controllers 118. The protocol analyzer 140 monitors and logs traffic between the host devices 104 and the memory array. In contrast to a protocol analyzer 140 embedded in the memory device 114, including the protocol analyzer 140 in a separate device attached to the link between the host device 104 and memory device 114 may interfere with or slow down the host-memory communications. Embedding the protocol analyzer 140 in the memory controller 118 allows the logging to be done at high speed.

The information captured (e.g., detected and stored) by the protocol analyzer 140 can be used by programmers to determine behavior of a software program and the memory performance when executing the program. The memory array is used as normal memory for the program. A portion of the memory array is used to store log data collected by the protocol analyzer 140. A programmer can reserve or allocate a certain amount of the memory array for log data, and can configure the logic of the protocol analyzer 140 by sending a command to memory controller 118 with the start address of the log and the size of the log.

Figure 3:
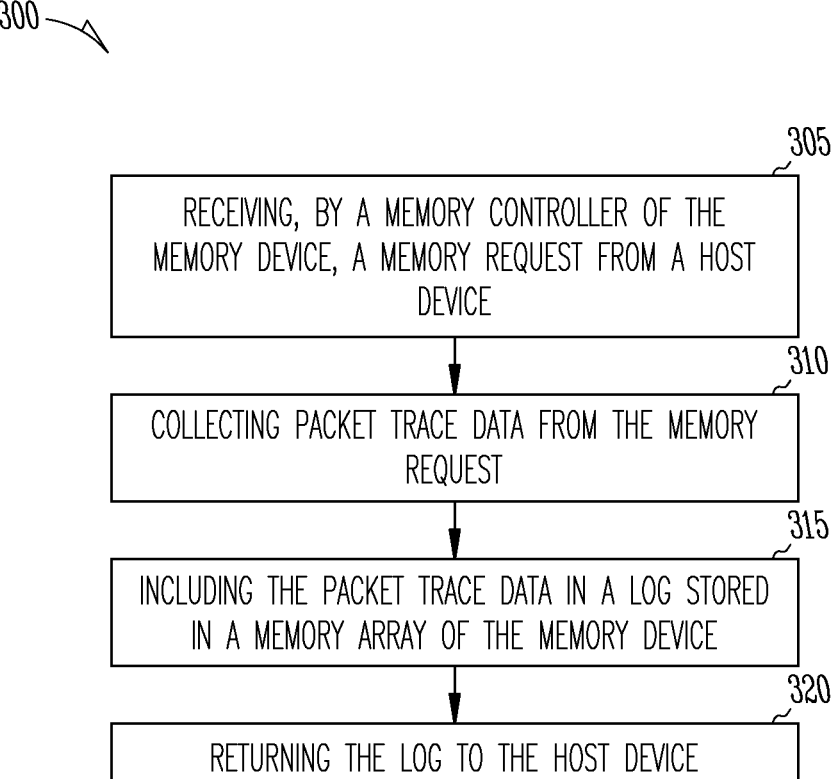
FIG. 3 is a flow diagram of a method of operating a memory device according to some examples described herein.

FIG. 3 is a flow diagram of a method 300 of operating a memory device (e.g., memory device 114 in FIG. 1) to monitor and log traffic between a host device (e.g., host device 104 in FIG. 1) and the memory of the memory device.

At block 305, the memory controller of a memory device (e.g., the memory controller 118 of FIG. 1) receives a memory request from a host device. The memory request may be a memory read request, a memory write request, or another type of memory request.

At block 310, a protocol analyzer embedded in the memory controller (e.g., protocol analyzer 140 in FIG. 1) collects packet trace data from the memory request. In some examples, the packet trace data can include a command of the memory request (e.g., a read command or a write command) and the address of the memory request. If the memory request is a write request, the packet trace data can include the write data. If the memory request is a read request, the packet trace data can include the read data loaded from memory. In some examples, the packet trace data can include the payload size of the write request or the read request. The packet trace data may also include an identifier (ID) for the host device sending the memory request. The packet trace data can include a timestamp of the memory request. The timestamp can be a current time in clock cycles or nanoseconds.

At block 315, the packet trace data is stored in the log in the memory array. The memory for the log can be reserved by sending a command to the memory controller that includes a memory address for the start address of the log and the size of the log in memory. This mapping gives direct load-store access to the program for the log data created by the program.

At block 320, the logged packet trace data is returned to the host device or devices. The packet trace data can be returned to the host device by a load command from the program. The program is given access to its own log data by default. In some examples, the protocol analyzer includes a log status register for the log, and the protocol analyzer can indicate a log full status using the log status register. The host device may read the status register and retrieve the packet trace data stored in the log in response to the log being full. In some examples, the protocol analyzer sends an interrupt to the host device and the host device reads the log data in response to the interrupt.

In some examples, the protocol analyzer can configure multiple logs in the memory array. This is useful to buffer the log data. For example, if two logs are configured in the log region of the memory array, the protocol analyzer can switch to storing the packet trace data in the second log when the first log becomes full. The log data from the first log can be sent to the host device when the first log becomes full. One or more status registers may be used to indicate the log status for every log configured by the protocol analyzer. In certain examples, the interrupt to the host device can indicate which log is full, or the host device can keep track of which log is currently in use and has a full status.

Figure 4:
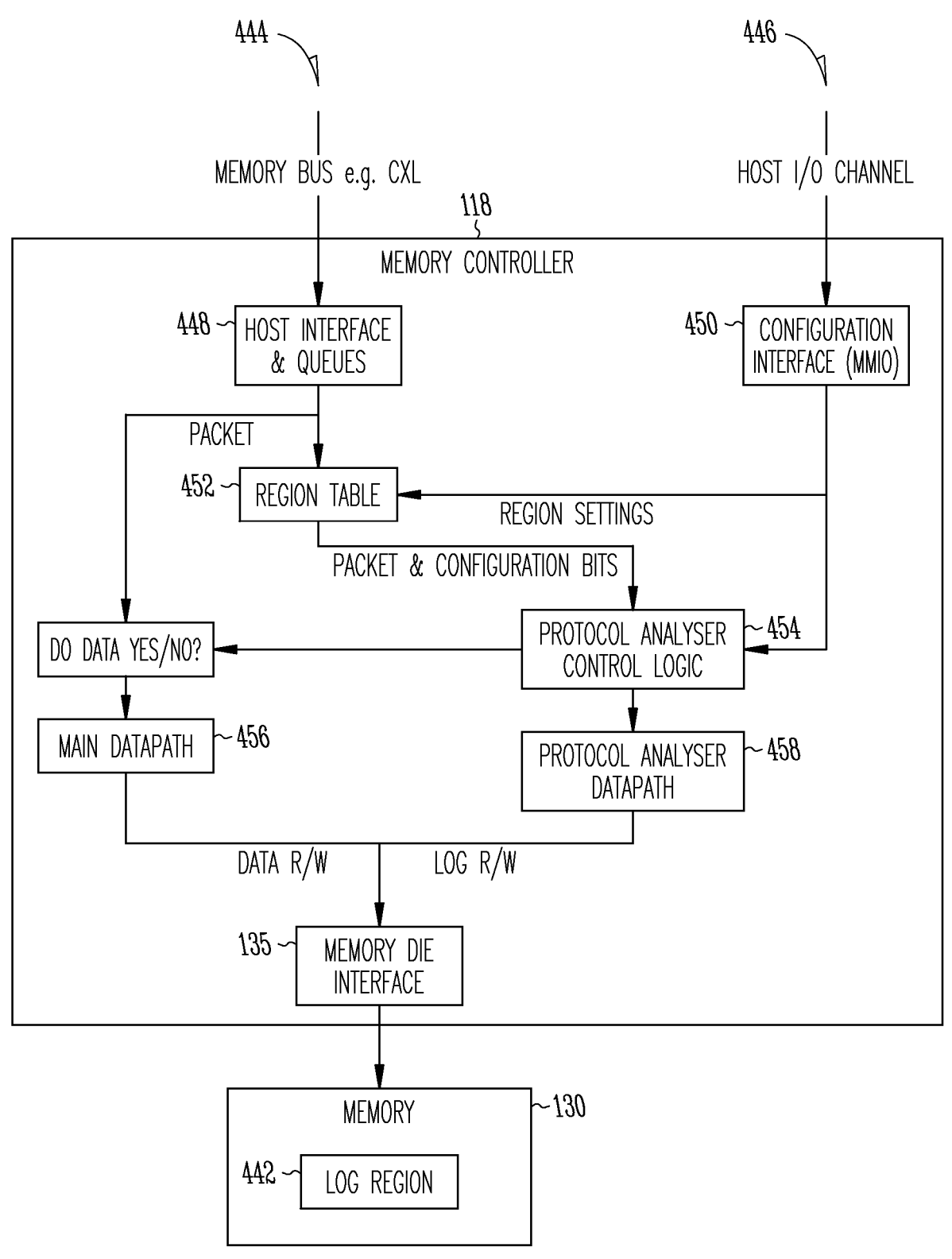
FIG. 4 is a block diagram of a memory controller of a memory device according to some examples described herein.

FIG. 4 is a block diagram of the memory controller 118 and the memory die or memory dies 130 of FIG. 1. The block diagram shows the log region 442 of memory and shows the logic of the protocol analyzer 140 in more detail. The log region 442 can include one log or more than one log. The interconnect link between the memory switch and the memory controller 118 includes a memory bus 444 (e.g., CXL) and a host input/output (I/O) channel 446. The memory bus is a data interface, and the memory requests can be received by the memory controller 118 via the memory bus. The memory requests can be stored in one or more queues 448. The packet trace data can include a queue identifier identifying which queue received the memory request. The host I/O channel 446 can include a configuration interface 450 accessed by the host devices 104 using memory mapped I/O. The host I/O channel 446 is used for control and configuration information. The interrupt to the host device 104 can be sent using the host I/O channel 446, or a log status register can be read using the host I/O channel 446.

The configuration interface 450 can be used to configure the logic of the protocol analyzer 140, such as by a host device 104 sending a command via the host I/O channel 446. The region table 452 provides both the bounds of the log region and the log region configuration for packet tracing preferences. Multiple packet tracing preferences or features can optionally be configured into the protocol analyzer 140 by sending commands to the memory controller 118 to set fields of the region table 452.

For instance, selective tracking configurations can be programmed into the protocol analyzer 140. The collecting of different packet trace data can be enabled for different address ranges of the log region 442. This allows different packet trace data to be collected for memory requests to different address ranges. Command filter options can be enabled to collect packet trace data for only a subset of the memory requests. In some examples, command filters can be enabled and disabled to optionally collect packet trace data for only a subset of the host devices 104 and for only certain operation types per address range.

Another example of a selective tracking configuration is logging-only mode. In logging-only mode, the protocol analyzer 140 disables the normal reading of data of a memory read request, and disables the normal writing of data of a memory write request for all address ranges or only for certain address ranges specified by the programmer. The packet trace data is still collected and logged for the disabled memory read and write requests.

The logging-only mode reduces the demand on bandwidth of the main memory shared for logging and read/write data ignated performance or event counters (e.g., one or more of a row buffer hit indicator, bandwidth utilization, memory request latency, a heat map counter value for an address or address range, and a device health status). The logging-only mode is also useful for logging data object accesses that have no control dependencies on them (e.g., neural network weights).

Table 1 shows an example of a region table 452. The fields listed are only examples and additional fields could be included in the region table 452. In some examples, a different region table 452 is used for each configured log region, and in some examples one region table is used for all the log regions. The region table 452 may be looked up by the protocol analyzer control logic 454 upon every memory request to determine what protocol analyzer action and configuration should be taken.

TABLE 1

| Field | Description |
| --- | --- |
| Logging Mode | Off: no logging is done.<br>Command only: only log commands and addresses.<br>Data only: only log read/write data values.<br>Command + Data: Log commands and data.<br>. . .<br>(and various other enable bits, for example, to enable logging of other command packet metadata including priority, source ID, and other fields) |
| Data Enable (Do Data in FIG. 2) | On (default): Continue to read and write memory locations as normal, and log in addition to this.<br>Off: Disable performing normal data writes, and return any (e.g., zero, random) data on a read. This is a logging-only mode.<br>Off with Read Metadata: Same as Off, except that a configurable Read response can be given containing useful information. Examples include:<br>Current position in the log buffer. This information can be used by the program<br>A performance counter such as current bandwidth or latency<br>Device health information (e.g., error counts) |
| Start address | Beginning of the log region reserved by software |
| Size | Size of the reserved log region |
| Filter Specification | A set of masks (can include wildcards) that are compared against various fields of the request packet. This allows logging of only specific types of commands, or from specific requesting Host IDs, or with a specific priority of command or size of a payload, for example. A match causes the bus packet to be sent to the Protocol Analyzer control logic for logging. |
| Logging Field Enable Bits | A set of bits indicating which parts of a packet get recorded in each log entry. Examples include:<br>Timestamp: current time in (fixed frequency) clock cycles or nanoseconds<br>Command<br>Address<br>Payload size<br>Data Value<br>Source Host ID<br>Priority | storage by preventing normal reads and writes from occurring to the specified memory regions that have data disabled, and the memory requests are dedicated to only providing packet trace data. This allows the logging to occur at or near real-time bandwidths. Write data in the memory write requests can be ignored and memory read requests can be responded to without accessing the memory dies 130. The protocol analyzer 140 can optionally return useful status information with the read request response, such as how full the log is currently. Logging-only mode can also provide instant feedback for the memory request by returning des- The region table 452 can include a Logging Mode field. The Logging Mode field can be used to set the logging by the protocol analyzer control logic 454 into one of four or more different states. The first state is an Off state, in which no logging of packet trace data is performed. The second state is a Command Only state in which the protocol analyzer control logic 454 only logs command types (e.g., read, write, etc.) and the memory addresses of the memory requests. The third state is a Data Only state in which only the write data or the read data of a memory request is logged. In variations, addresses are logged with the data. The fourth state is a Command+Data state in which the command types, addresses, and data are all logged. The Logging Mode field can include additional enable bits to enable additional states. For example, the Logging Mode field may include bits to optionally enable logging of other command packet metadata (e.g., priority of the packet, source identifier of the packet, etc.).

The region table 452 can include a Data Enable field. The Data Enable field may have three states: On, Off, and Off with Read Metadata. In the On state, memory locations are written and read as normal with memory requests, and packet trace data is logged for the memory requests in addition to the memory data. The On state may be the default state for the Data Enable field. The protocol analyzer control logic 454 enables the main data path 456 to memory and the protocol analyzer data path 458 to memory in the On state.

In the Off state, normal data writes are disabled for memory write requests, and no read data is returned for memory read requests. This is a logging-only mode in which the packet trace data is collected for the memory requests, but no data is written or returned, although log status (e.g., full status) can be returned. The protocol analyzer control logic 454 disables the main data path 456 to memory and enables the protocol analyzer data path 458 to memory in the Off state. By preventing normal reads and writes from happening to special logging regions with Data Enable turned off, a lot of bandwidth to the memory dies 130 can be saved and dedicated to logging writing the log when executing the program.

In the Off with Read Metadata state, normal data writes are disabled for memory write requests, and normal read data is not returned for memory read requests. However, a configurable read response is returned that can contain useful information (read metadata) for the programmer. For example, the read response can include the current position in the log, which may be used by a program running on a host device 104. The read response may also include a performance counter (e.g., indicating current bandwidth of the memory or latency of the memory) and memory health information (e.g., error counts).

The region table 452 can also include the log configuration information such as the log start address in memory and the size of the log reserved in memory. The region table 452 can also include the start address and size for more than one log. For example, in a two-log buffered approach, the region table 452 can include the start addresses in memory of the two logs.

The region table 452 can include a Filter Specification field. The Filter Specification field includes a set of masks (e.g., bit-level masks) that are compared against various fields of the memory request packets. Only those packets having fields matching the set of masks are sent to the protocol analyzer control logic 454 for logging. Some examples of the masks include specific command types, specific requesting host device IDs, packets with a specific priority, and a packet payload size. A match between the masks in the Filter Specification field and the fields of a received memory request packet send the packet to the protocol analyzer control logic 454 for logging.

The region table 452 can include a field for Logging Field Enable Bits. The Logging Field Enable Bits are a set of bits indicating which part of a memory request packet gets included in the packet trace data stored in the log region of the memory array. Some of the Logging Field Enable Bits specify storing information that may not be included in the packet. Some examples of information that can be optionally included in the stored packet trace data include a timestamp of the memory request packet being received by the memory device 114 (e.g., in clock cycles or nanoseconds), the command of the packet, the address, the payload size, the Source Host ID, and the packet priority.

Another packet tracing feature provided by the embedded protocol analyzer is marker embedding. In marker embedding, a host device 104 can write to a marker control register using a special address exposed by the protocol analyzer control logic 454. The write request inserts a marker event in the packet trace data stored in the log. The marker event can be an arbitrary data value. In certain examples, the marker event is a value of an automatically incrementing counter. In certain examples, the marker event is specific data the programmer wants to track (e.g., the virtual address of a load/store instruction).

A software program can write any data value as the marker value. If the software simultaneously writes a log entry of a function call context, or other context, it is possible to align the software program code with the packet trace data offline. A compiler, binary instrumentation, or a programmer can record markers by inserting non-temporal write instructions directed at the marker control register in the software program. The program or utility library code called by the program can simultaneously log information about the program state or the function name as part of the marker value stored in the log.

Table 2 is an example of code to store a marker event in a log. The code first calls a library function (get_trace_control_ptr) to get the address of the marker control register where the marker values will be written. Non-temporal store instructions that do not cache the written data can then write to the address indicated by the pointer with the marker value written to the log. In Table 2, the non-temporal store instruction (storeNT) forms markers by concatenating the process ID (PID), the codes' own instruction pointer (IP) (e.g., the code pointer to the storeNT instruction), and identifier (ID) that can be random, set sequentially, or determined by another scheme. These parameters of the marker value are available to either of the compiler, binary instrumentation, or the programmer, and through an Operating System (OS) function call.

TABLE 2

```
1. uint *pTC = get_trace_control_ptr( )
2. storeNT( pTC, (PID | IP | ID+0))
3. func Function_1
   3.1.  store 0x1000, 11
   3.2.  storeNT( pTC, (PID | IP | ID+1))
   3.3.  Function_1_1
      3.3.1.  load R1, 0x2000
      3.3.2.  storeNT( pTC, (PID | IP | ID+2))
   3.4. return
4. storeNT( pTC, (PID | IP | ID+3))
5. return
```

While the program code is running, it writes a unique marker value to the log at the entry and exit of each function call. The end result is a log of normal program memory accesses interspersed with marker entries. Note that in a system with cache memories, only loads and stores that miss in the cache will be logged, while all markers are always logged. Moreover, any log entry could be reordered, by an out-of-order processor or other reordering in the storage system. Table 3 shows an example of a log generated using binary instrumentation.

TABLE 3

```
MARKER: (PID | IP | ID+0)
WRITE: addr = 0x1000, data = 11
MARKER: (PID | IP | ID+1)
READ: addr = 0x2000, data = 0xFFFF
MARKER: (PID | IP | ID+2)
MARKER: (PID | IP | ID+3)
```

The markers in the log can be used for alignment of the program and the memory operations. Parts of the program (e.g., function calls) are associated with the memory operations that appear during executing the functions or close to them in time. This allows programmers to see which parts of a program cause memory patterns on regions of interest such as objects (bandwidths, latencies, access frequencies, etc.). For a stricter alignment, reordering of instructions can be enforced using barrier instructions in the binary instrumentation. With the appropriate fields encoded in the markers, it is possible for the programmer to get all the necessary information about the function calls using only the recorded packet trace data. This is true when the user includes the current function pointer or instruction address as part of the marker value.

An alternative approach to alignment is to record two logs simultaneously; one log recorded in software (e.g., saved to disk of the host device) and the other log recorded by the protocol analyzer embedded in the memory controller 118. Whenever a write is made to the memory control register, the marker value is also logged to the file in software along with the name of the calling function. The markers and packet trace data are collected by hardware as usual. After capturing the packet trace data in the two logs, the log data is retrieved from the memory controller 118, and an alignment tool (e.g., a process executing on a host device 104) scans through both logs from beginning to end searching for a window of marker values that substantially match in both logs (e.g., a match of 90% of the markers in the window). This provides an approximate alignment of where the function calls relate in time to the locations of the stored markers.

The alignment using markers embedded in the log allows programmers and system designers to get detailed feedback on program behavior and memory performance. This helps the programmers and system designers to optimize the configuration of the software and hardware.

The systems, devices, and methods described herein provide for protocol analyzers embedded in memory to monitor and log traffic on an interconnect bus (e.g., between a Host processor and memory such as a CXL or Gen-Z protocol link, storage device, or network device). Logging can be done at high speed so as not to interfere with or slow down communications. Embedding the protocol analyzer 140 in the memory device 114 reduces the cost of high-speed protocol analysis and capture compared to other protocol monitoring approaches. It also removes the need for expensive hardware and software tools for trace-level performance analysis and software optimization by customers (software) and hardware designers.

Figure 5:
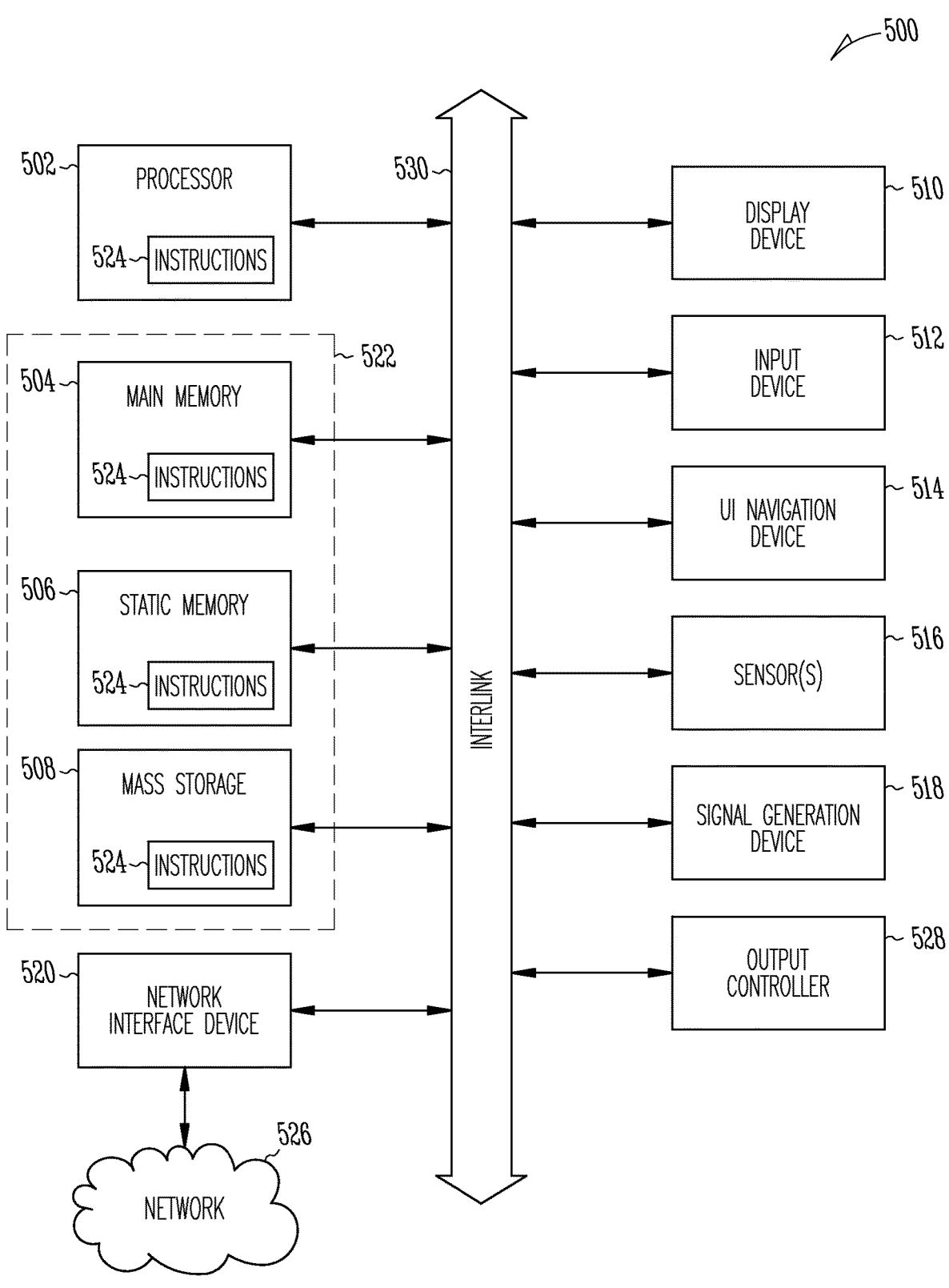
FIG. 5 illustrates a block diagram of an example machine according to some examples described herein.

FIG. 5 illustrates a block diagram of an example machine 500 upon which any one or more of the techniques (e.g., methodologies) described herein may be performed. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drives, tape drives, flash storage, or other block devices) some or all of which may communicate with each other via an interlink (e.g., bus) 530. One or both of the main memory and the static memory can include one or more SSD storage devices, PCI-SIG type storage devices, or SNIA type storage devices. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage system (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine-readable media 522. While the machine-readable medium 522 is illustrated as a single medium, the term "machine readable medium" may include a single medium or multiple media (e.g., a centralized or distributed database, and/or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 522 may be representative of the instructions 524, such as instructions 524 themselves or a format from which the instructions 524 may be derived. This format from which the instructions 524 may be derived may include source code, encoded instructions (e.g., in compressed or encrypted form), packaged instructions (e.g., split into multiple packages), or the like. The information representative of the instructions 524 in the machine readable medium 522 may be processed by processing circuitry into the instructions to implement any of the operations discussed herein. For example, deriving the instructions 524 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 may include assembly, compilation, or interpretation of the information (e.g., by the processing circuitry) to create the instructions 524 from some intermediate or preprocessed format provided by the machine readable medium 522. The information, when provided in multiple parts, may be combined, unpacked, and modified to create the instructions 524. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

The processing device 502 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 can be configured to execute instructions 524 for performing the operations and steps discussed herein. The computer system 500 can further include a network interface device 520 to communicate over a network 526.

The storage system 508 can include a machine-readable storage medium (also known as a computer-readable medium) on which is stored one or more sets of instructions 524 or software embodying any one or more of the methodologies or functions described herein. The instructions 524 can also reside, completely or at least partially, within the main memory 504 or within the processing device 502 during execution thereof by the computer system 500, the main memory 504 and the processing device 502 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 500 may further include a display unit, an alphanumeric input device (e.g., a keyboard), and a user interface (UI) navigation device (e.g., a mouse). In an example, one or more of the display unit, the input device, or the UI navigation device may be a touch screen display. The machine is a signal generation device (e.g., a speaker), or one or more sensors, such as a global positioning system (GPS) sensor, compass, accelerometer, or one or more other sensors. The machine 500 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 524 (e.g., software, programs, an operating system (OS), etc.) or other data stored on the storage system 508 can be accessed by the main memory 504 for use by the processing device 502. The main memory 504 (e.g., DRAM) is typically fast, but volatile, and thus a different type of storage than the storage system 508 (e.g., an SSD), which is suitable for long-term storage, including while in an "off" condition. The instructions 524 or data in use by a user or the machine 500 are typically loaded in the main memory 504 for use by the processing device 502. When the main memory 504 is full, virtual space from the storage system 508 can be allocated to supplement the main memory 504; however, because the storage system 508 device is typically slower than the main memory 504, and write speeds are typically at least twice as slow as read speeds, use of virtual memory can greatly reduce user experience due to storage system latency (in contrast to the main memory 504, e.g., DRAM). Further, use of the storage system 508 for virtual memory can greatly reduce the usable lifespan of the storage system 508.

The instructions 524 may further be transmitted or received over a network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 508 may include one or more physical jacks (e.g., Ethernet, coaxial, or phone jacks) or one or more antennas to connect to the network 520. In an example, the network interface device 508 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium capable of storing, encoding, or carrying instructions for execution by the machine 500, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell includes reading from, writing to, or erasing the memory cell. The operation of placing a memory cell in an intended state is referred to herein as "programming," and can include both writing to or erasing from the memory cell (i.e., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times.

Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Example 1 includes subject matter (such as a memory device) comprising one or more integrated circuit (IC) memory dies configured as a memory array, and a memory controller to control access to the memory array. The memory controller is configured to receive a memory request from a host device, collect packet trace data from the memory request, include the packet trace data in a log stored in a log region of the memory array, and return the log to the host device.

In Example 2, the subject matter of Example 1 optionally includes a memory controller configured to receive multiple memory requests from the host device, compare the memory requests to one or more packet trace filters, capture packet trace data from only a subset of the multiple memory requests having properties specified in the one or more packet trace filters and not capture packet trace data from memory requests not having the properties specified in the one or more packet trace filters, and store the captured packet trace data in the log.

In Example 3, the subject matter of Example 2 optionally includes a memory controller configured to receive the one or more packet trace filters from the host device, receive a configuration from the host device of a log region of the memory array for the log, and collect packet trace data according to the one or more packet trace filters and store the packet trace data in the log region.

In Example 4, the subject matter of one or any combination of Examples 104 optionally includes a memory controller configured to receive an indication of one or more fields of the memory request to include in the packet trace data, and collect data from the indicated one or more fields of the memory request and store the data in the log as the packet trace data.

In Example 5, the subject matter of one or any combination of Examples 1-4 optionally includes a memory controller configured to collect the packet trace data from the memory request, and disable one or both of writing write data in the memory request to the memory array and returning read data for the memory request when a data disable is active in the memory controller.

In Example 6, the subject matter of one or any combination of Examples 1-6 optionally includes a memory controller configured to receive a memory read request with an indication of data disable from the host device, log packet trace data from the memory request in the log, disable including read data in a response to the memory read request, and include read metadata in the response to the memory read request.

In Example 7, the subject matter of one or any combination of Examples 1-6 optionally includes a memory controller that includes a marker control register writable by the host device. The memory controller is configured to store a marker value in the log with the packet trace data according to the marker control register.

In Example 8, the subject matter of one or any combination of Examples 1-7 optionally includes a memory controller configured to receive a configuration from the host device of a first log region of the memory array for the log and a second log region for the log, storing the packet trace data in a first log region of the log and storing the packet trace data in a second log region of the log when the first log region is full, and returning the first log region when the first log region is full.

Example 9 includes subject matter (such as a method of operating a memory device) or can optionally be combined with one or any combination of Examples 1-8 to include such subject matter, comprising receiving, by a memory controller of the memory device, a memory request from a host device, collecting packet trace data from the memory request, including the packet trace data in a log stored in a memory array of the memory device, and returning the log to the host device.

In Example 10, the subject matter of Example 9 optionally includes receiving multiple memory requests from the host device, capturing packet trace data from only a subset of the multiple memory requests having properties specified in one or more packet trace filters, and storing the captured packet trace data in the log.

In Example 11, the subject matter of Example 10 optionally includes receiving the one or more packet trace filters from the host device, receiving a log size and log start address from the host device specifying a log region of the memory, capturing the packet trace data for the subset of multiple memory requests according to the one or more packet trace filters and storing the packet trace data in the log region of the memory array.

In Example 12, the subject matter of Example 10 optionally includes receiving multiple memory requests from the host device, receiving one or more data logging field enables from the host device, and only logging enabled packet trace data from the multiple memory requests in the log.

In Example 13, the subject matter of one or any combination of Examples 9-12 optionally includes receiving an indication of data disable from the host device, logging packet trace data from the memory request in the log, and disabling writing data and disabling returning read data for the memory request in response to the indication of data disable.

In Example 14, the subject matter of one or any combination of Examples 9-13 optionally includes receiving a memory read request with an indication of data disable from the host device, logging packet trace data from the memory request in the log for the memory read request, disabling returning read data for the memory read request, and returning read metadata to the host device in a response to the memory read request.

In Example 15, the subject matter of one or any combination of Examples 1-14 optionally includes receiving a marker with the memory request, and storing the marker in the log with the packet trace data for the memory request.

In Example 16, the subject matter of Example 15 optionally includes the host device writing a marker value to a marker control register of the memory controller to insert the marker value in the log.

In Example 17, the subject matter of one or any combination of Examples 9-16 optionally includes storing the packet trace data in a first log region of the log and storing the packet trace data in a second log region of the log when the first log region is full, and returning the first log region when the first log region is full.

Example 18 includes subject matter (such as a computer system) or can optionally be combined with one or any combination of Examples 1-17 to include such subject matter, comprising at least one host device including a host processor, a memory bus and a host input/output (I/O) channel, and at least one memory device coupled to the at least one host device by the memory bus and host I/O channel. The memory device includes one or more integrated circuit (IC) memory dies configured as a memory array, and a memory controller to control access to the memory array. The memory controller is configured to reserve a log in the memory array according to log configuration information received from the at least one host device via the host I/O channel, receive memory requests from the at least one host device via the memory bus, store packet trace data from the memory requests in the log, and return the packet trace data stored in the log to the host device.

In example 19, the subject matter of Example 18 optionally includes log configuration information received from the host device that includes log memory start address and a log memory size, and one or more data field enables. The memory controller is configured to capture packet trace data from only a subset of the multiple memory requests having properties specified in the one or more packet trace filters, and only capture packet trace data enabled by the one or more data field enables, and store the captured packet trace data in the log.

In Example 20, the subject matter of one or both of Examples 18 and 19 optionally includes a memory controller that includes a log status register readable via the host I/O channel, and the memory controller is configured to set the log status register to a log full status the log is full packet trace data.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement of any of Examples 1-20.

Example 24 is a method to implement of any of Examples 1-20.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory device comprising:
one or more integrated circuit (IC) memory dies configured as a memory array; and
a memory controller to control access to the memory array, the memory controller configured to:
receive a memory request from a host device;
collect packet trace data from the memory request;

include the packet trace data in a log stored in a log region of the memory array;

disable one or both of writing write data in the memory request to the memory array and returning read data for the memory request when a data disable is active in the memory controller; and return the log to the host device.

2. The memory device of claim 1, wherein the memory controller is configured to:

receive multiple memory requests from the host device;

compare the memory requests to one or more packet trace filters;

capture packet trace data from only a subset of the multiple memory requests having properties specified in the one or more packet trace filters and not capture packet trace data from memory requests not having the properties specified in the one or more packet trace filters; and store the captured packet trace data in the log.

3. The memory device of claim 2, wherein the memory controller is configured to:

receive the one or more packet trace filters from the host device;

receive a configuration from the host device of a log region of the memory array for the log;

collect packet trace data according to the one or more packet trace filters and store the packet trace data in the log region.

4. The memory device of claim 1, wherein the memory controller is configured to:

receive an indication of one or more fields of the memory request to include in the packet trace data; and collect data from the indicated one or more fields of the memory request and store the data in the log as the packet trace data.

5. The memory device of claim 1, wherein the memory controller is configured to:

receive a memory read request with an indication of data disable from the host device;

log packet trace data from the memory request in the log;

disable including read data in a response to the memory read request; and include read metadata in the response to the memory read request.

6. The memory device of claim 1, wherein the memory controller includes a marker control register writable by the host device, and wherein the memory controller is configured to store a marker value in the log with the packet trace data according to the marker control register.

7. The memory device of claim 1, wherein the memory controller is configured to:

receive a configuration from the host device of a first log region of the memory array for the log and a second log region for the log;

storing the packet trace data in a first log region of the log and storing the packet trace data in a second log region of the log when the first log region is full; and wherein the returning the log to the host device includes returning the first log region when the first log region is full.

8. A method of operating a memory device, the method comprising:

receiving, by a memory controller of the memory device, a memory request from a host device and receiving an indication of data disable from the host device;

collecting packet trace data from the memory request;

including the packet trace data receiving an indication of data disable from the host device in a log stored in a memory array of the memory device;

disabling writing data and disabling returning read data for the memory request in response to the indication of data disable; and returning the log to the host device.

9. The method of claim 8, including:

receiving multiple memory requests from the host device;

capturing packet trace data from only a subset of the multiple memory requests having properties specified in one or more packet trace filters; and storing the captured packet trace data in the log.

10. The method of claim 9, including:

receiving the one or more packet trace filters from the host device;

receiving a log size and log start address from the host device specifying a log region of the memory; and capturing the packet trace data for the subset of multiple memory requests according to the one or more packet trace filters and storing the packet trace data in the log region of the memory array.

11. The method of claim 9, including:

receiving multiple memory requests from the host device;

receiving one or more data logging field enables from the host device; and wherein the capturing the packet trace data includes only logging enabled packet trace data from the multiple memory requests in the log.

12. The method of claim 9, including:

logging packet trace data from the memory request in the log for the memory read request; and returning read metadata to the host device in a response to the memory read request.

13. The method of claim 8, wherein the receiving the memory request from the host device includes:

receiving a marker with the memory request; and storing the marker in the log with the packet trace data for the memory request.

14. The method of claim 13, wherein the receiving the marker includes the host device writing a marker value to a marker control register of the memory controller to insert the marker value in the log.

15. The method of claim 8, wherein the storing the packet trace data in the log includes storing the packet trace data in a first log region of the log and storing the packet trace data in a second log region of the log when the first log region is full; and wherein the returning the log to the host device includes returning the first log region when the first log region is full.

16. A computer system comprising:

at least one host device including a host processor;

a memory bus and a host input/output (I/O) channel; and at least one memory device coupled to the at least one host device by the memory bus and host I/O channel, wherein the memory device includes:

one or more integrated circuit (IC) memory dies configured as a memory array; and a memory controller to control access to the memory array, the memory controller configured to:

reserve a log in the memory array according to log configuration information received from the at least one host device via the host I/O channel;

US 12,681,845 B2

21 receive memory requests from the at least one host device via the memory bus;

store packet trace data from the memory requests in the log;

disable one or both of writing write data in the memory request to the memory array and returning read data for the memory request when a data disable is active in the memory controller; and return the packet trace data stored in the log to the host device.

17. The computer system of claim 16, wherein the log configuration information received from the host device includes:

a log memory start address and a log memory size;

one or more packet trace filters;

one or more data field enables; and wherein the memory controller is configured to:

capture packet trace data from only a subset of the multiple memory requests having properties specified in the one or more packet trace filters, and only capture packet trace data enabled by the one or more data field enables; and store the captured packet trace data in the log.

18. The computer system of claim 16, wherein the memory controller includes:

a log status register readable via the host I/O channel, and wherein the memory controller is configured to set the log status register to a log full status the log is full packet trace data.

\* \* \* \* \*